Nov. 3, 1925.

J. F. JENNINGS

PIPE FITTING

Filed June 30, 1923 2 Sheets-Sheet 1

1,559,706

INVENTOR
John F. Jennings,
BY Bates & Macklin,
ATTYS.

Nov. 3, 1925.  1,559,706
J. F. JENNINGS
PIPE FITTING
Filed June 30, 1923   2 Sheets-Sheet 2
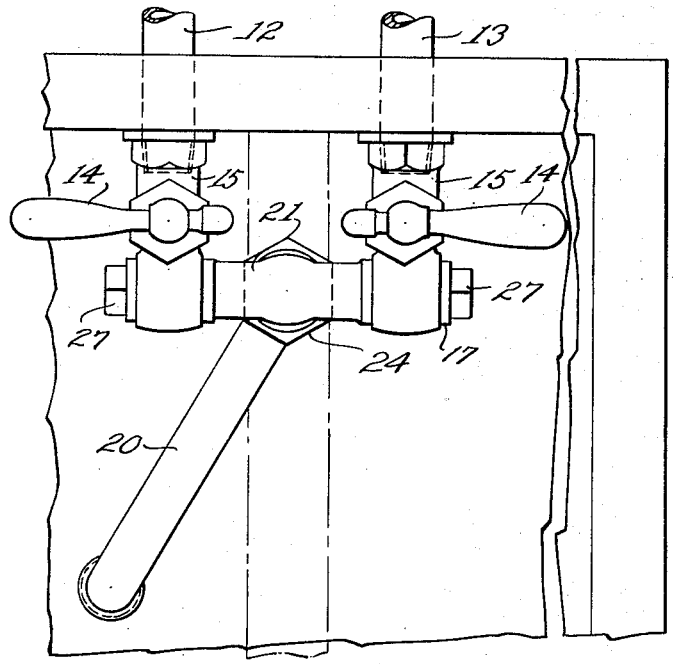
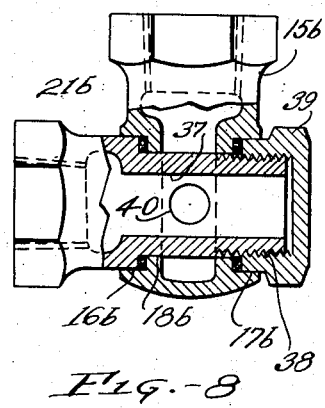
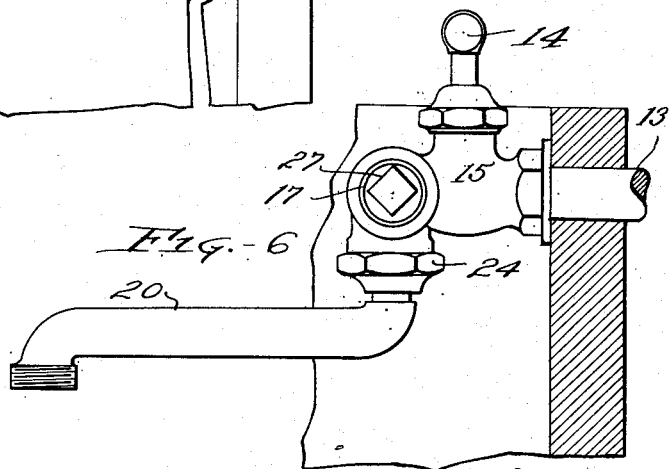
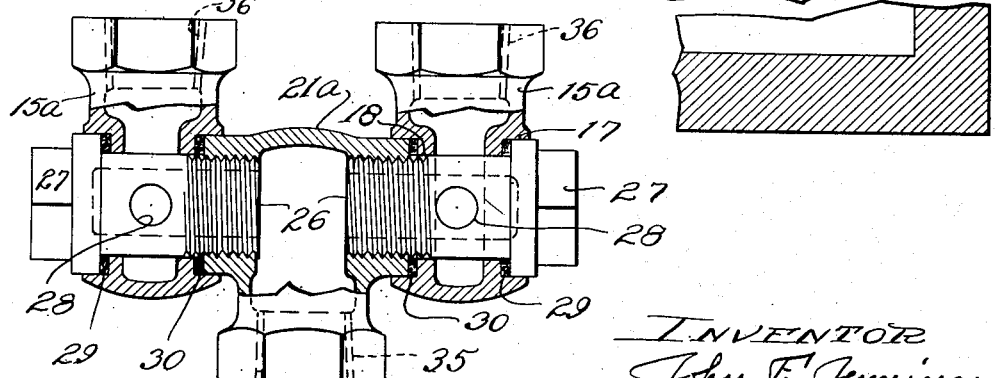
INVENTOR
John F. Jennings
By Bates & Macklin
ATTORNEYS Patented Nov. 3, 1925.

1,559,706

UNITED STATES PATENT OFFICE.

JOHN F. JENNINGS, OF CLEVELAND, OHIO.

PIPE FITTING.

Application filed June 30, 1923. Serial No. 648,686.

*To all whom it may concern:*

Be it known that I, JOHN F. JENNINGS, a citizen of the United States, residing at Cleveland, in the county of Cuyahoga and State of Ohio, have invented a certain new and useful Improvement in a Pipe Fitting, of which the following is a full, clear, and exact description, reference being had to the accompanying drawings.

This invention relates to devices which may be used for general pipe fitting work and has for one of its objects the provision of a device which accomplishes in a single fitting, the results obtained by the combined use of a pipe union with another fitting such as an L or a T or the like.

In combined hot and cold water faucets having a common discharge, the practice heretofore has been to make the faucet and discharge conduit an integral casting. The installation of a faucet of this type, particularly on laundry trays has necessitated the use of differently shaped faucets depending upon the location of the inlet conduit with relation to the tray. The difficulty of attaching a combined hot and cold water faucet to the inlet conduit through holes cut in the back of the laundry tray is considerably augmented, particularly since it is usually necessary to cut the holes in the tray sufficiently large to receive a union.

Another object of my invention therefore, is the provision of a device which may be employed as a connecting medium between hot and colt water faucets so as to provide a common discharge conduit. In this connection, my invention contemplates a connection which is movable relatively to the faucet and is separable therefrom, wherefore the faucet may be directly connected to the inlet conduit, and the intermediate connection subsequently attached, thus obviating the necessity for a union between the faucet and pipe.

The means for carrying out my invention will be hereinafter fully set forth in the following description which pertains to the accompanying drawings. The essential features of my invention will be summarized in the claims.

Figure 1:
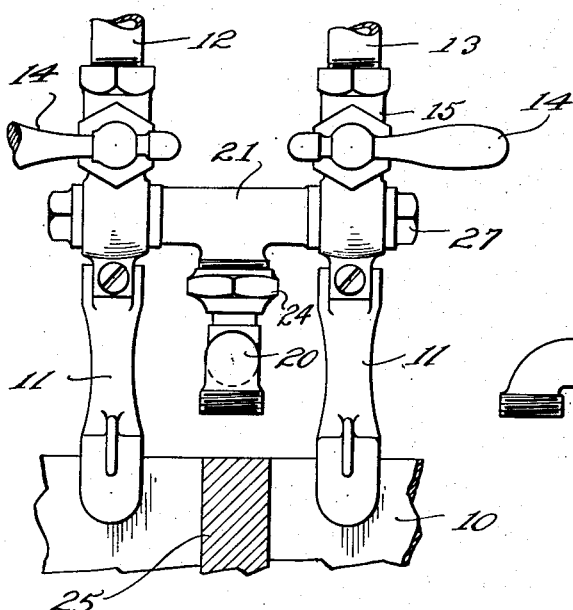
Figure 2:
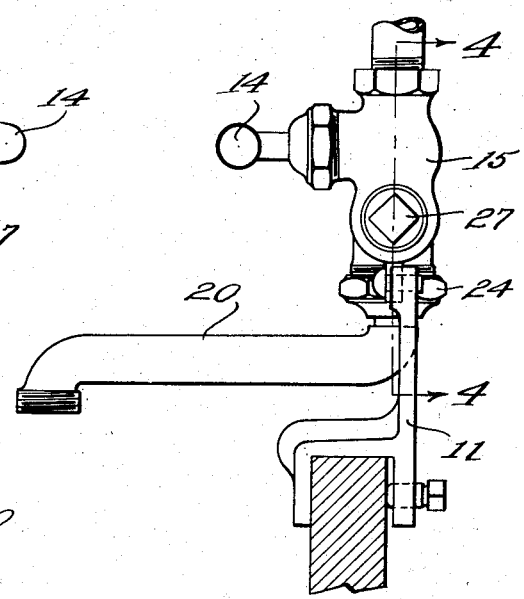
Figure 3:
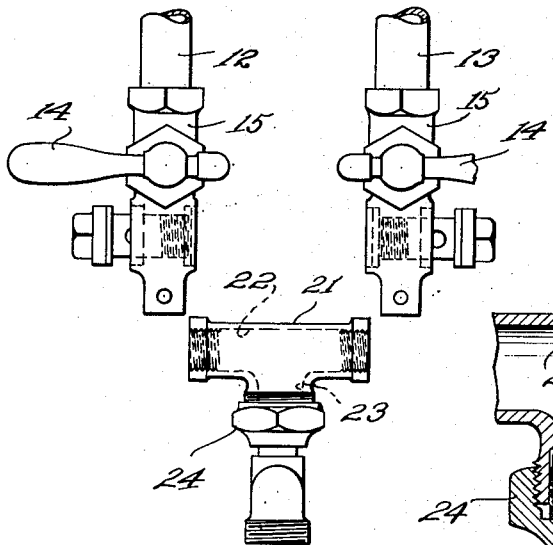
Figure 4:
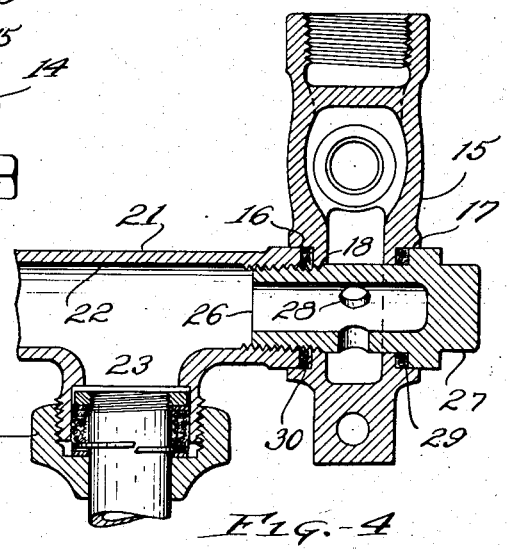

In the drawings, Fig. 1 is a front elevation of a combined hot and colt water faucet embodying my invention and attached to the back of a laundry tray; Fig. 2 is a side elevation of the device shown in Fig. 1; Fig. 3 is a front elevation showing the movable connection between the hot and cold water faucets; Fig. 4 is a longitudinal section on an enlarged scale taken on the line 4—4 in Fig. 2; Figs. 5 and 6 are plan views and side elevations respectively of a faucet embodying my invention and showing the adaptability of connection to a laundry tray; and Figs. 7 and 8 are sections showing the adaptability of my invention for pipe fittings, apart from the faucet.

In Figs. 1 to 6, I have shown my invention as comprising a part of a combined hot and cold water faucet. Moreover, I have shown the faucet as being attached to the back 10 of a laundry tray by means of brackets 11, and as being connected to inlet conduits 12 and 13 respectively. The valve construction employed comprises globe valves which may be operated by handles 14 in the customary manner. Each faucet moreover, has a laterally extending passageway 18 which is arranged to communicate with the passageway through the discharge conduit.

My invention contemplates the use of a connecting piece intermediate the hot and cold water faucets, which connecting piece serves as a common discharge conduit and is adapted to receive a spout 20. The connection illustrated comprises a member 21 having a longitudinally extending passageway 22 and a transversely extending passageway 23. The spout 20 is adapted to be connected so as to communicate with the transverse passageway by a pivotal connection indicated generally at 24. This permits the spout to be directed to either side of a partition 25 in the tray, to which the faucet is attached. The use of an intermediate connecting member 21 permits the faucets to be individually connected to the respective inlet conduits without necessitating the use of a pipe union.

The preferred manner of attaching the intermediate member 21 to the faucet is illustrated in Fig. 4 wherein the casing 15 is recessed as at 16 and 17 on opposite sides of the transverse passageway 18. A plug or sleeve 26 may extend through the passageway 18 and may be exteriorly threaded on one end to engage a correspondingly interior thread on the end of the member 21. The outer end of the member 26 may be squared as at 27 to receive a wrench while the interior of the plug is provided with openings 28 to permit the passage of water from the faucet into the discharge conduit. Suitable gaskets 29 and 30 effect a water-tight connection with the faucet.

Figs. 5 and 6 show the adaptability of a faucet constructed in accordance with my invention for attachment to the inlet conduits through openings cut in the back of a laundry tray. The openings through the tray may be large enough only to admit the conduits since the faucet may be operatively connected to the conduits independently of each other before the connecting piece 21 is attached. Moreover, the construction illustrated, enables the spout to be moved in a vertical plane with relation to the faucet wherefore the faucet can be readily secured either to horizontal inlet conduits or to vertical conduits without necessitating the use of special castings for each installation.

My invention is well adapted for use as a standard pipe fitting such as an L and when so used serves in addition as a pipe union. Thus, I may obtain the result effected by the use of an L and a union, by the use of only a single fitting. For example in Fig. 7, the invention is shown as a Y fitting wherein an intermediate connecting piece is illustrated at 21ª, and the end pieces are illustrated by the members 15ª.

The member 21ª may be threaded as at 35 for receiving a conduit, not shown, while the members 15ª may be interiorly threaded as at 36 for receiving different conduits, not shown. The mechanism for connecting the member 21ª to the end members is preferably the same as that above set forth in the description pertaining to Fig. 4. This construction then permits the members 15ª to be individually connected to inlet conduits independently of the member 21ª, which may be subsequently attached as heretofore described. Moreover, the connecting piece 21ª may be rotated relatively to the member 15ª wherefore connections may be made between conduits which extend in various directions, without necessitating a specially made fitting for each installation.

Referring now to Fig. 8, I have shown a fitting as an L wherein one piece is indicated at 15ᵇ while the other piece is indicated by a member 21ᵇ. As a modification of the means for attaching the two members together however, I have illustrated the member 21ᵇ as having an extension 37 which projects through the transverse passageway 18ᵇ, and is exteriorly threaded, as at 38, for receiving a cap 39. The extension is provided with openings 40 for permitting the passage of fluid from the member 15ᵇ to the member 21ᵇ and vice versa. It will be understood that the member 15ᵇ may be attached to a conduit, not shown, and that the member 21ᵇ may be attached to a conduit extending at right angles to the first conduit wherefore the device serves as a union in addition to an L. Moreover, the recesses 16ᵇ and 17ᵇ are similar, wherefore the member 21ᵇ may be extended through the member 15ᵇ in either direction and secured thereto.

From the foregoing description, it will be seen that I have provided a device which serves as a combined union and fitting, thus obviating the necessity for two fittings. Moreover, my invention is well adapted for use as a connecting means between hot and cold water faucets, so as to permit connection with inlet conduits which extend in any direction without requiring the use of a union, and without necessitating a specially made faucet for each installation.

I claim:—

1. In combination, a faucet having passage-ways extending transversely therethrough, a hollow bolt having a shoulder engaging one side of the faucet and having a shank extending through the faucet and projecting beyond the opposite side, there being a passage-way extending laterally through the bolt and providing communication between the interior of the bolt and the interior of the faucet, and a discharge member in threaded engagement with that portion of the bolt protruding from the faucet, the end of the bolt adjacent the member being open to provide communication between the member and the interior portion of the bolt.

2. In combination a pair of faucets, an open ended bolt extending through each faucet and a common discharge conduit in threaded engagement with each of said bolts, each bolt functioning to clamp the discharge member between the faucets, and each bolt having a laterally extending passage-way providing communication between the interior thereof and the interior of the associated faucet.

3. In combination, a pair of faucets each having a passage-way extending transversely thereof and entirely therethrough, a T shaped discharge conduit having the ends adjacent the faucets internally threaded, a spout swivelled to the discharge conduit intermediate the faucets, a hollow bolt extending through the transverse passage-way in each faucet and having one end externally threaded to engage one of the internally threaded ends on the discharge conduit, each bolt having a shoulder adjacent the outer side of associated faucet, whereby the bolts function to clamp the faucets to the discharge conduit, and also function as a conduit for providing communication between the discharge conduit and the associated faucet.

In testimony whereof, I hereunto affix my signature.

JOHN F. JENNINGS.